Patented Nov. 3, 1931

1,829,869

UNITED STATES PATENT OFFICE

WILBUR A. LAZIER, OF ELMHURST, DELAWARE, ASSIGNOR TO E. I. DU PONT DE NEMOURS & COMPANY, OF WILMINGTON, DELAWARE, A CORPORATION OF DELAWARE

PROCESS OF FORMING CYCLIC ALCOHOLS AND KETONES

No Drawing.   Application filed April 23, 1930.   Serial No. 446,799.

This invention relates to a process for the manufacture of ketones and cyclic alcohols, and more particularly to a process for producing these compounds by the hydrogenation of a phenol and the simultaneous dehydrogenation of a secondary aliphatic alcohol.

It is an object of this invention to provide a process for the simultaneous manufacture of ketones and cyclic alcohols. A further object is to provide a hydrogenation process in which the hydrogen is supplied by one of the reactants. A still further object is to simultaneously carry out hydrogenations and dehydrogenations in such a way that the net heat of reaction is substantially zero. Another object is to produce hydrogenated products of phenol. It is a specific object to form cyclohexanol, cyclohexanone and acetone by the dehydrogenation of isopropyl alcohol and the simultaneous hydrogenation of phenol. Other objects will appear hereinafter.

These objects are accomplished by the following invention which in its broadest aspects comprises heating a mixture of a noncyclic secondary aliphatic alcohol, such as isopropyl alcohol, and a phenol, such as hydroxybenzene, in the presence of a catalyst capable of inducing both hydrogenation and dehydrogenation at an elevated temperature and pressure.

I have set forth in the following examples several preferred embodiments of my invention, but they are included merely for purposes of illustration and are not to be regarded as a limitation.

*Example 1.*—A catalyst was prepared as follows: Basic nickel carbonate was precipitated from a solution of nickel nitrate also containing kieselguhr by the addition of sodium carbonate solution. The resulting nickel hydroxide was reduced with hydrogen at 450° C. producing a catalyst consisting of nickel and nickel oxide supported on kieselguhr and containing about 20% of reduced nickel.

180 grams (3 mols) of isopropyl alcohol and 94 grams (1 mol) of anhydrous phenol were mixed and heated with good agitation in the presence of 5 grams of a catalyst prepared as just described for 3½ hours in a closed tube at 200° C. The pressure on the system at the end of the heating period amounted to about 500 lbs. per square inch. After cooling, the tube contained very little gas indicating that any evolved hydrogen had been reabsorbed. A sample of the liquid products was subjected to careful fractionation, yielding 98.5 cc. of acetone, 17 cc. of isopropyl alcohol, 40 cc. of a mixture of cyclohexanol and cyclohexanone, and 25 cc. of phenol. From these figures the conversion of isopropyl alcohol to acetone was found to be about 85% and the conversion of phenol to hydrogenated products about 58%.

*Example 2.*—225 cc. (3 mols) of isopropanol was heated with 110 cc. (1 mol) of crude cresylic acid in a sealed tube in the presence of 10 grams of a nickel catalyst prepared as above and containing about 15% of reduced nickel. The mixture was agitated vigorously for 6 hours while the temperature was held at 200° C. The products were cooled and fractionally distilled, yielding 87 cc. of pure acetone, 87 cc. of recovered isopropyl alcohol, 60 cc. of a mixture of cyclic alcohols and ketones, and 37 cc. of unchanged cresylic acid.

*Example 3.*—A solution of one mol of phenol in three mols of isopropyl alcohol was pumped continuously at the rate of 200 cc. per hour through a vaporizer and over 100 cc. of granular nickel catalyst contained in a pressure resisting tube. The temperature of the tube was maintained at 225° C. and the exit was kept closed until the pressure had risen to 400 lbs. per square inch. The liquid products obtained in the reaction were then drawn off in a continuous manner and analyzed by fractional distillation. In this way it was found that a conversion could be obtained of 73% of isopropyl alcohol to acetone and 28% of the phenol to cyclohexanol and cyclohexanone.

The process which is the subject of this invention is capable of operation between any alcohols capable of dehydrogenation and phenols capable of hydrogenation, provided the initial materials and products are not subject to side reactions at the temperatures required for the hydrogenation and dehydrogenation reactions. Among the many alcohols which are particularly adapted for use in the process may be mentioned the secondary alcohols, such as isopropyl and secondary butyl alcohols. Primary alcohols, such as ethyl, propyl, normal butyl, isobutyl, and amyl may also be used, but owing to the ease with which aldehydes obtained by the dehydrogenation of primary alcohols undergo reactions of polymerization to give waste products, I prefer to employ the secondary alcohols.

Among the phenols which may be affectively hydrogenated by my process may be mentioned monohydric phenols, such as ortho, meta and para cresols; dihydric phenols, such as resorcinol and quinol, trihydric phenols such as pyrogallol, and the naphthols, especially beta naphthol. The process is applicable to the hydrogenation of a single phenol or a mixture of phenols. For example, I may hydrogenate a single cresol or a mixture of several cresols, as well as a single naphthol or a mixture of naphthols.

Any suitable hydrogenation catalyst may be employed, for example, copper, nickel, iron, cobalt, platinum, or silver, but I prefer to use a reduced nickel catalyst supported upon kieselguhr. The particular catalyst selected for the reaction may be prepared in a variety of ways, among which may be mentioned the reduction of the oxides, hydroxides or carbonates of the metal with hydrogen at a temperature in the vicinity of 400–500° C.

The hydrogenated products obtained consist of a mixture of cyclic ketone and cyclic alcohol. For example, from phenol I obtain a mixture of cyclohexanone and cyclohexanol, the greater part of the product being cyclohexanone, but it is to be understood that the proportions of both cyclic alcohol and cyclic ketone will vary somewhat with the temperature of the operation. Simultaneously with the formation of the mixture of cyclic products, there is obtained a ketone corresponding to the secondary alcohol undergoing dehydrogenation. For example, isopropyl alcohol is dehydrogenated to form acetone.

The cyclohexanone-cyclohexanol mixture may be used as a solvent as such, or it may be further hydrogenated to the pure alcohol or dehydrogenated to the pure ketone by passage over a suitable catalyst.

The operation may be conducted in either the liquid or vapor phase. When operating in the liquid phase, the alcohol and phenol in the liquid form are heated in a closed system in the presence of hydrogenating catalysts. When the vapor phase method is employed, the alcohol-phenol mixture is passed continuously in the vapor phase over a stationary hydrogenation catalyst. It is of course to be understood that by the term "hydrogenation catalyst" I refer to a catalyst capable of inducing both hydrogenation and dehydrogenation. It is also possible to conduct the process continuously by pumping the mixture to be treated through a series of autoclaves in such a way that the material removed from the last autoclave is substantially an equilibrium mixture of the products and reactants.

It is not necessary that the theoretical molecular ratio of the two reactants be used in all cases, for, if it is desired to increase the conversion of phenol at the expense of the alcohol, a larger proportion of the latter compound should, of course, be employed.

The operating temperature should be one suitable for both the hydrogenation of the particular phenol and for the dehydrogenation of the particular alcohol selected, when the two reactions are carried out separately. For example, suitable temperatures may be selected between 180° and 250° C., the preferred temperature being for most reactions about 200° C.

Pressure requirements are attained automatically in closed systems, but in open reaction systems a pressure in excess of 100 lbs. per square inch should be maintained.

The process of my invention has many advantages among which may be mentioned the following. By taking advantage of the fact that the dehydrogenation of an alcohol is very endothermic, while the hydrogenation of a phenol is quite exothermic, I am enabled to carry out my process by the use of a reaction the net heat of which is substantially zero, the one reaction supplying practically all of the heat necessary to maintain the other. Another advantage is that no independent source of hydrogen is required in order to obtain valuable hydrogenated products, since the necessary hydrogen is supplied by one of the reactants. A further advantage is that I am enabled to produce both a dehydrogenated product such as acetone and a hydrogenated product such as cyclohexanone in a single plant operation, thus effecting economies of equipment and materials.

As many apparently and widely different embodiments of this invention may be made without departing from the spirit and scope thereof, it is to be understood that I do not limit myself to the specific embodiments thereof except as defined in the appended claims.

I claim:

1. The process of forming a mixture of cyclic alcohols and cyclic ketones by simultaneous hydrogenation and dehydrogenation which comprises passing a vapor mixture of a non-cyclic secondary aliphatic alcohol of not more than four carbon atoms and a phenol at a temperature of 180–250° C. and a pressure of at least 100 lbs. per square inch over a catalyst capable of inducing both hydrogenation and dehydrogenation.

2. The process of forming cyclohexanol by dehydrogenating isopropyl alcohol and simultaneously hydrogenating phenol which comprises heating a mixture of said alcohol and phenol to a temperature of 200–225° C. at a pressure of 400–500 lbs. per square inch in the presence of a nickel catalyst capable of inducing both hydrogenation and dehydrogenation.

3. The process of forming a solvent mixture of cyclohexanol, cyclohexanone, and acetone by dehydrogenating isopropyl alcohol and simultaneously hydrogenating phenol, which comprises heating a mixture of approximately three mols of said alcohol and one mol of phenol to a temperature of about 200° C. at a pressure of about 500 lbs. per square inch in the presence of a reduced nickel catalyst.

4. The process of forming a mixture of cyclic alcohols and ketones by simultaneous hydrogenation and dehydrogenation which comprises heating a mixture of a non-cyclic secondary aliphatic alcohol of not more than four carbon atoms and a phenol at a temperature of 180° C.–250° C. and a pressure of at least 100 lbs. per square inch in contact with a catalyst capable of inducing both hydrogenation and dehydrogenation.

In testimony whereof, I affix my signature.

WILBUR A. LAZIER.